UNITED STATES PATENT OFFICE.

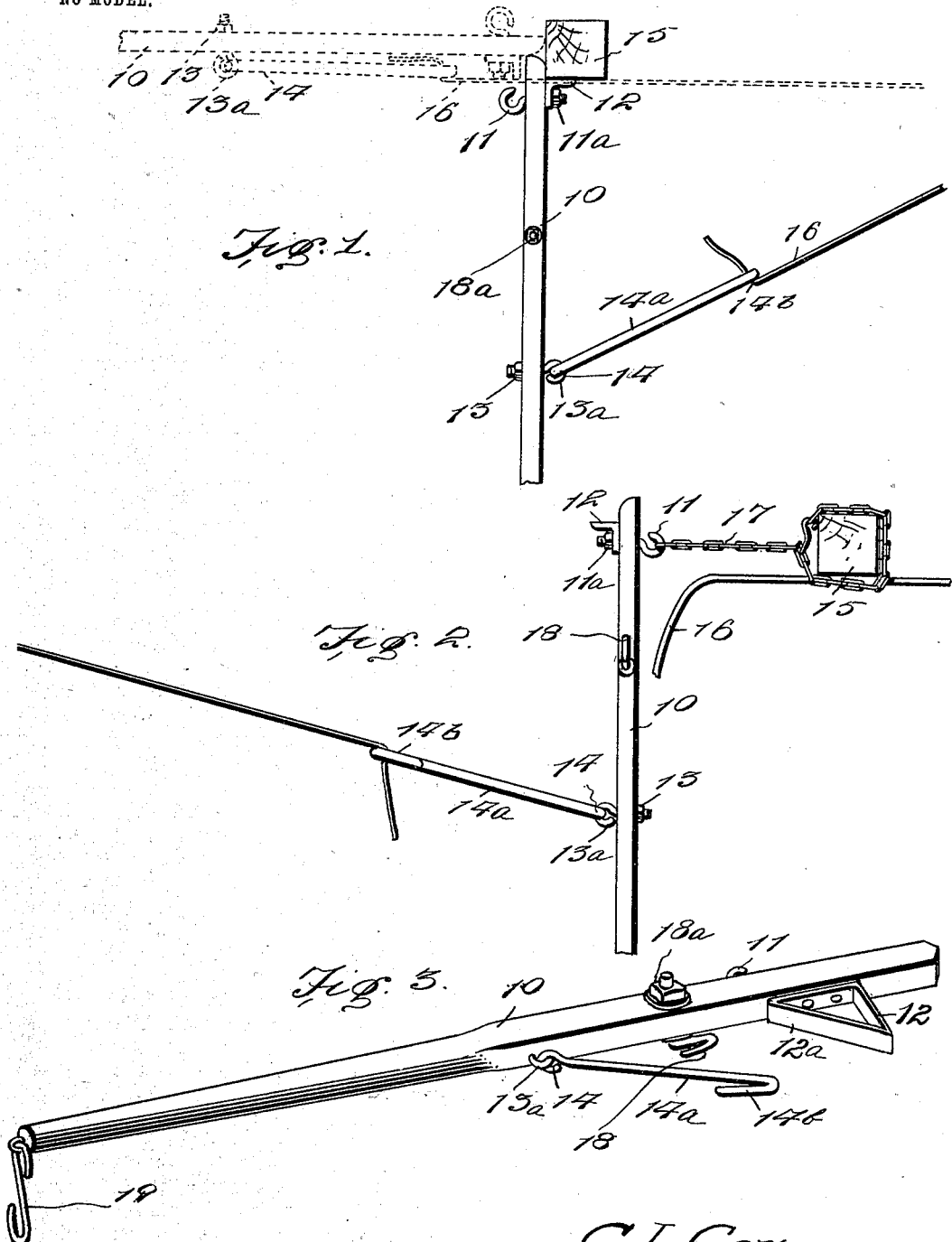

CAINE LAFAYETTE COX, OF ATHENS, AND JAMES WILLIAM SOUTHERLAND, OF CHANDLER, TEXAS.

WIRE-STRETCHER.

SPECIFICATION forming part of Letters Patent No. 723,244, dated March 24, 1903.

Application filed May 29, 1902. Serial No. 109,531. (No model.)

*To all whom it may concern:*

Be it known that we, CAINE LAFAYETTE COX, residing at Athens, and JAMES WILLIAM SOUTHERLAND, residing at Chandler, in the county of Henderson and State of Texas, citizens of the United States, have invented a new and useful Wire-Stretcher, of which the following is a specification.

This invention relates to devices for stretching wires, more particularly in building fences; and the invention consists in certain novel features of the construction, as hereinafter shown and described, and specified in the claim.

In the drawings illustrative of the invention, Figure 1 is a view of the implement applied in stretching a line-wire in fence-building. Fig. 2 is a view illustrating the manner of using the implement in drawing the adjacent ends of two wires together in repairing fences. Fig. 3 is a perspective view of the implement detached.

The implement comprises a lever or handle 10, of any suitable length and size, but which will generally be about five feet long and about three inches square at the larger end, and preferably tapered and rounded into a hand-grip at the other end.

Attached to one side of the larger end of the lever 10 is an open eyebolt 11, the shank of the eyebolt secured in place by a nut $11^a$, the nut being also utilized to secure an angular stop-bar 12, extending at right angles from the lever, as shown. Intermediate of the lever 10 is revolubly secured by a nut 13 another eyebolt $13^a$, the eye portion extending from the side opposite the eye of the bolt 11, and engaging this eyebolt by a corresponding eye 14 is a rod $14^a$, the outer end of this rod being turned backward for a distance, as shown at $14^b$. The recess formed by turning the end $14^b$ backward is in a comparatively long V shape, as shown, so that it will grip a small or large wire equally well. The eyebolts 11 and $13^a$ may be any desired distance apart and the rod $14^a$ may be of any desired length; but in practice we have found that for a five-foot lever 10 the eyebolts should be about fifteen inches apart and the rod $14^a$ should be about eighteen inches long.

In using the implement for stretching the line-wires across the fence-posts the implement is placed against a post, (indicated at 15,) with one face of the angular stop 12 bearing against one side of the post, as shown in Fig. 1, and the coacting face of the lever bearing against the adjacent side, the corner of the post fitting into the angular recess thus formed by one face of the angular stop 12 and the extremity of the lever beyond said stop. The wire (represented at 16) is then drawn as tightly as it conveniently can be by hand and inserted into the V-shaped cavity at $14^b$ and pressed into the cavity and slightly bent. This will firmly couple the wire to the rod and prevent the possibility of slipping. Then the lever is moved around horizontally in the direction indicated by the arrow until it is in substantial alinement with the line-wire, as indicated by dotted lines in Fig. 1. This will bring the line-wire across the post 15 in position to be secured by staples in the ordinary manner. The "leverage" grows greater and greater as the outer end of the lever is brought around nearer and nearer into an alined position with the line-wire, so that at the last part of the movement the "pull" is very strong, and this strong pull is at the point where most needed and where the resistance is greatest. When the adjacent ends of two wires are to be united, as when uniting the ends of broken wires or when inserting a section of wire between broken ends, the implement is reversed and the butt-end united to the post 15 nearest the break by a chain 17, coupled to the eyebolt 11, as indicated in Fig. 2. The broken end of the wire is then coupled to the rod $14^a$ and the lever operated as before, which will draw one broken end into coupling relations to the other end. The implement is thus adapted to all the uses for which such implements are usually employed and will very effectually do the work required of it.

The eyebolt $13^a$ will be swiveled in the lever, so that the rod $14^a$ will freely yield to the changing positions of the lever and not become cramped or broken by any unequal or side strains. The stop-bar 12 will be formed with its outer end sharpened or "chisel-edged," as shown, to form a means for severing the wire, which will be done by placing the chisel-edge of the stop beneath the wire and striking the wire with a hammer or other similar implement. This makes a very important feature of the implement and adds materially to its efficiency. The stop 12 may be provided with a diagonal brace 12ª, as in Fig. 3, if preferred, to strengthen the stop.

A "grip-bolt" 18 will be attached to the bar 10 intermediate of the eyebolts 13ª and 11, formed similar to the grip 14ᵇ and adapted to engage the wire 16 when required by means of a nut 18ª on the opposite side of the bar, as shown. When the break in a wire is too remote from a post 15 to conveniently employ a chain 17, one end of the broken wire will be engaged by the grip 18 and the other end by the grip 14ᵇ and the bar 10 drawn around until the parts 14ᵇ and 18 are brought into close proximity, which will likewise bring the broken ends of the wire into position for coupling. This makes a very convenient and useful adjunct to the device and greatly increases its usefulness.

The free or handle end of the bar 10 will preferably be provided with a hook 19 to enable the lever to be tied fast after it has been operated to hold the wire while being coupled or stapled, so that one person can perform all the work.

The eyebolt 11 will also be found very useful in drawing staples and also in assisting in forcibly adjusting the wires upon the post, and thus obviating the necessity for the operator handling the wires, which are frequently barbed, with the hands.

The end of the bar 10 beyond the stop 12 may be extended, as shown in Fig. 3, if a longer "nip" is required.

Having thus described our invention, what we claim is—

In a wire-stretcher, the combination of a lever forming a handle, an eyebolt forming a shank extending through the same near the point thereof, an angular stop engaging said shank, a nut mounted on the latter and securing said eyebolt and stop in position, an auxiliary, oppositely-extending swiveled eyebolt, a rod connected with the latter and having a bent end forming a V-shaped grip, and a grip-bolt having a V-shaped member, said grip-bolt extending transversely through the lever-bar between and at right angles to the eyebolt.

In testimony that we claim the foregoing as our own we have hereto affixed our signatures in the presence of two witnesses.

CAINE LAFAYETTE COX,
JAMES WILLIAM SOUTHERLAND.

Witnesses:
J. C. BEALL,
R. M. LUCAS.